April 21, 1925.
J. D. HILLIARD
OIL SWITCH
Filed March 10, 1923
1,534,707
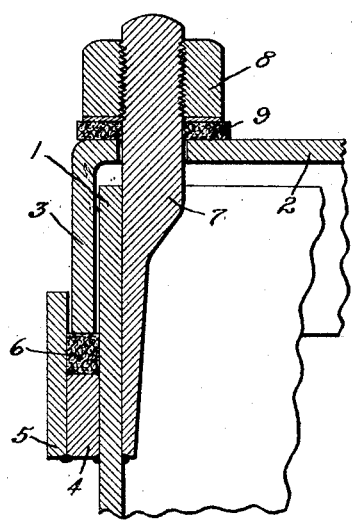
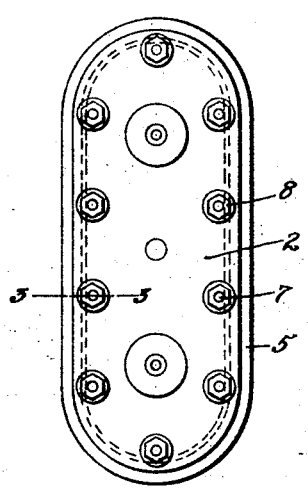
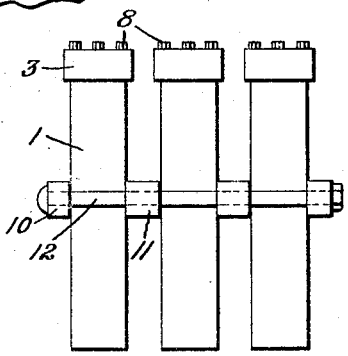
Inventor:
John D. Hilliard,
by Alexander S. ????
His Attorney.

Patented Apr. 21, 1925.

1,534,707

UNITED STATES PATENT OFFICE.

JOHN D. HILLIARD, OF SCHENECTADY, NEW YORK, ASSIGNOR TO GENERAL ELECTRIC COMPANY, A CORPORATION OF NEW YORK.

OIL SWITCH.

Application filed March 10, 1923. Serial No. 624,253.

*To all whom it may concern:*

Be it known that I, JOHN D. HILLIARD, a citizen of the United States, residing at Schenectady, county of Schenectady, State of New York, have invented certain new and useful Improvements in Oil Switches, of which the following is a specification.

My invention relates to electric switches of the type in which the circuit is broken between contacts which are immersed in oil, the oil being contained in a tightly closed tank.

An object of my invention is to provide an improved means for closing the top of an oil tank which, while simple and economical of manufacture, is capable of maintaining a tight joint against the comparatively great pressure often generated within the tank and is of such a nature that the exterior of the tank is left unencumbered and free for the addition of bracing or clamping means.

While my invention is described and illustrated as applied to an oil switch tank, it is obvious that it is by no means limited to such use but may be employed to advantage with other apparatus, as for example, oil cooled transformers.

My invention will be better understood by reference to the accompanying specification and drawing and its scope will be pointed out in the appended claims.

Figure 1 is an end elevation of a group of three oil switch tanks embodying my invention.

Fig. 2 is a top plan view, drawn to a larger scale, of one of the tanks shown in Fig. 1.

Fig. 3 is a fragmentary sectional view taken on the line 3—3 of Fig. 2 and drawn to a still larger scale.

In the drawing, 1 represents an oil switch tank, preferably constructed of iron or steel, and 2 the cover therefor having a downturned flange 3 extending around the exterior of the tank. Spaced from the upper edge of the tank is a narrow band 4 which surrounds the tank and is secured thereto by welding. About the band 4 is a second band 5 somewhat wider than the band 4 and arranged to project above the same, the two bands being secured together also by welding. The thickness of the band 4 is shown somewhat greater than that of the flange 3 of the cover and seated in the cavity formed by the tank and two bands is a gasket 6 of suitable packing material. For holding the cover firmly down against this gasket, bolts such as that shown at 7 are provided having reduced inner end portions and screw-threaded outer ends passing through holes in the cover. The reduced portion of a bolt is secured to the inner surface of the tank by welding while a nut 8 threaded upon the outer portion of the bolt clamps against a gasket 9. By this means the cover may be firmly clamped to the tank, the gasket 6 forming a gas and oil tight joint between the tank and the cover while the gasket 9 seals the opening around the bolt 7.

The necessary welding between the tank and the bolt and the inner band as well as between the two bands may be conveniently done by the well known arc welding process. It will be noted that the band 5 not only serves to retain the gasket 6 but also serves to prevent blowing out of the flange 3.

Where several tanks are used forming a group, as in Fig. 1, they may be clamped together and braced in the manner shown by means of end stays 10, fillers 11, and bolts 12. This means also serves to prevent bulging of the tanks due to gas pressure formed therein. An important advantage of the cover securing construction described above lies in the fact that with securing bolts attached to the inner surface of the tank the exterior thereof is left unencumbered and therefor free of anything that might interfere with whatever structure is used to brace or clamp the tanks together.

While I have described only one embodiment of my invention, I do not wish to be limited to the particular form shown and described as it will be apparent that many modifications therein may be made without departing from the scope of my invention as set forth in the appended claim.

What I claim as new and desire to secure by Letters Patent of the United States, is,—

A container for an oil switch comprising an oil tank, a cover having a depending flange fitting thereover, a band surrounding said tank and welded thereto, a second band surrounding said first band and extending above the same to form a channel, a gasket seated in said channel, a bolt welded to the inner face of said tank, said cover having an opening to receive said bolt, a gasket on said cover surrounding said bolt and a nut threaded in said bolt to clamp said cover against said first gasket.

In witness whereof, I have hereunto set my hand this 9th day of March, 1923.

JOHN D. HILLIARD.